United States Patent [19]

Ramamurti

[11] Patent Number: 4,606,061

[45] Date of Patent: Aug. 12, 1986

[54] LIGHT CONTROLLED X-RAY SCANNER

[75] Inventor: Krishnamurti Ramamurti, Pittsburgh, Pa.

[73] Assignee: Tokyo Shibaura Denki Kabushiki Kaisha, Kawasaki, Japan

[21] Appl. No.: 566,158

[22] Filed: Dec. 28, 1983

[51] Int. Cl.[4] ........................ H01J 35/06; H01J 35/00; G01N 23/00

[52] U.S. Cl. ........................................ 378/10; 378/136; 378/119

[58] Field of Search .................... 378/10, 119, 136, 15; 250/493.1; 376/104

[56] References Cited

U.S. PATENT DOCUMENTS

| | | | |
|---|---|---|---|
| 4,075,489 | 2/1978 | Neal et al. | 378/10 |
| 4,122,346 | 10/1978 | Enge | 250/398 |
| 4,130,759 | 12/1978 | Haimson | 378/10 |
| 4,158,142 | 6/1979 | Haimson | 378/10 |
| 4,287,425 | 9/1981 | Elliott, Jr. | 378/10 |

FOREIGN PATENT DOCUMENTS

| | | | |
|---|---|---|---|
| 0022036 | 3/1981 | Japan | 378/4 |

OTHER PUBLICATIONS

"Proposed System for Ultrafast Computed Tomography" Journal of Computed Assisted Tomography (Computed Tomography), 1[4], 1977, pp. 494–499, Iinuma, et al.

"Scanning Electron Beam CT Systems", Applied Radiology, Mar.–Apr. 1981, pp. 86–88, Hsu.

"Cinetomography", IMATRON, publication date unknown.

"Transmission Computed Tomography" Future Technologies, pp. 4366–4368, publication data unknown.

*Primary Examiner*—Craig E. Church
*Assistant Examiner*—Charles Wieland
*Attorney, Agent, or Firm*—Finnegan, Henderson, Farabow, Garrett & Dunner

[57] ABSTRACT

A light controlled X-ray scanner having a source of X-rays which includes parallelly oriented ring cathodes and anodes located within an annular evacuated closure. Provisions are made for sweeping a light beam around a surface of the cathode and extracting X-rays from a corresponding surface of the anode.

11 Claims, 4 Drawing Figures

LIGHT CONTROLLED X-RAY SCANNER

BACKGROUND OF THE INVENTION

I. Field of the Invention

This invention relates to the generation of high intensity X-rays for use in high speed computed tomography scanners.

II. Description of Prior Art

Computed tomography scanners are known which employ conventional X-ray tubes or radioactive nuclei to provide a single source of high intensity X-rays. This single source of X-rays is mechanically revolved about an object under observation, typically through use of a revolving ring mounted in a scanner gantry. Such prior art scanners have an inherent limitation in the speed with which a particular image may be produced due to speed limitations of the mechanical revolution of the single source of x-rays.

Computed tomography scanners are also known which employ a continuous annular anode x-ray source which surrounds an object. The anode x-ray source is scanned by an electron beam to selectively produce x-rays. The electron beam is derived from a single fixed electron beam generator located along the axis of an object and is deflected to the anode by deflection coils or the like. Accordingly, a large evacuated chamber is required to enclose the electron beam generator, the annular anode, and the path of travel of the electron beam between the beam generator and the anode. Moreover, because of the necessity of manipulating an electron beam over distances of several meters, focal spot sizes of the resultant beam on the cathode are larger than desirable. This in turn limits the spacial resolution achievable in such a scanner. Accordingly, such known annular anode scanners have the disadvantages of large focal spot sizes and the requirement of large evacuated vessels with the need for active electrical devices for focusing and deflection.

Computed tomography scanners are also known to be planned which propose the use of flash X-ray sources using high voltage discharges. The utilization of sequentially pulsed, high voltage discharge sources may prove capable of high speed resolution. However, independent control of X-ray energy intensity may prove difficult to implement.

It is, accordingly, an object of the present invention to provide a computed tomography scanner in which a focal spot of desired size can be readily attained and varied easily and continuously.

It is a further object of the present invention to provide a computed tomography scanner with simplified annular X-ray tube construction.

More specifically, it is an object of the present invention to provide a computed tomography scanner employing a continuous annular anode with a reduced evacuated vessel size over known continuous annular anode computed tomography scanners.

Additional objects and advantages of the subject invention will be set forth in part in the description which follows, and in part will be obvious from the description or may be learned by practice of the invention.

SUMMARY OF THE INVENTION

To achieve the foregoing objects, and in accordance with the purposes of the invention as embodied and broadly described herein, a computed tomography scanner is provided which comprises: (a) a source of X-rays comprising an annular chamber for at least partially surrounding an object under observation, an X-ray penetrable window in that chamber opening toward the object along a circumferential surface of the chamber, a light penetrable window opening along a circumferential surface of the chamber, an anode extending annularly around the interior of the chamber, a cathode extending annularly around the interior of the chamber in spaced apart relation to the anode and with one surface of the cathode located with relation to the light penetrable window to receive light therethrough; (b) a source of light; (c) means for selectively directing light from the light source through the light penetrable window onto portions of the one surface of said cathode to produce electrons therefrom; (d) means for providing a high voltage potential between the cathode and anode to accelerate the electrons from said portions of the one surface of said cathode toward corresponding portions of the anode to produce X-rays at the corresponding portions of the anode, at least some of which are directed out the X-ray penetrable window toward the object.

Preferably, the means for selectively directing light includes a rotating mirror. Moreover, the light source may produce visible or ultraviolet light, in which case the cathode preferably comprises a nonmetallic solid and the electrons are photoelectronically emitted. The light source may, in the alternative, produce infrared light, in which case the cathode is preferably tungsten and the electrons are thermionically emitted. For a thermionic cathode, an infrared laser will be necessary. For either photoelectric or thermionic cathode, the light source can be pulsed or continuous.

DESCRIPTION OF THE PREFERRED EMBODIMENT

Reference will now be made in detail to the present preferred embodiment of the subject invention as illustrated in the accompanying drawings.

Figure 1:
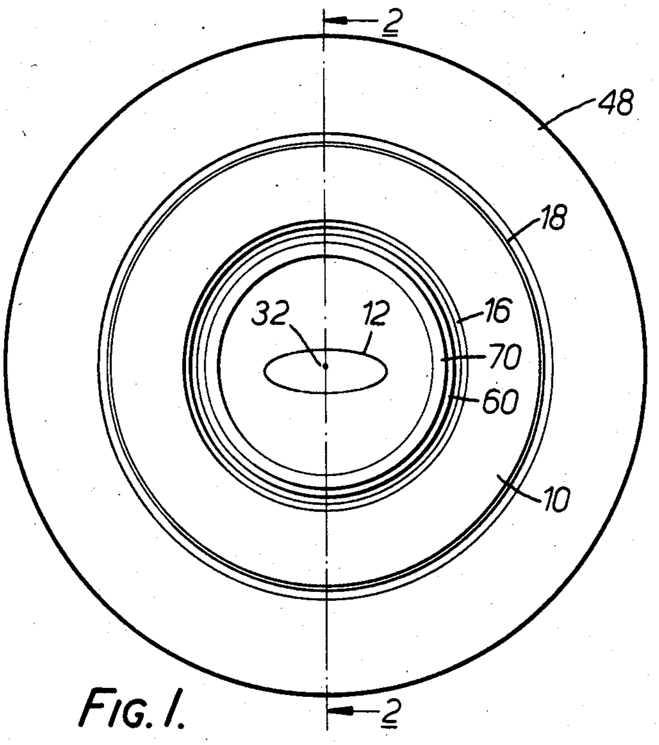
FIG. 1 is a head-on schematic cross-sectional illustration of a computed tomography scanner employing the teachings of the present invention.

There is illustrated in FIG. 1, a cross-sectional view of an annular vacuum chamber 10 which is shown to completely encircle an object under observation such as a patient 12. Chamber 10 preferably is constructed of stainless steel with an exterior lead coating to prevent uncontrolled escape of X-rays produced within chamber 10.

Within wall or surface 14 of chamber 10 there is located an X-ray penetrable window 16. Window 16 may, for example, be constructed of aluminum or beryllium. Window 16 is located circumferentially along surface 14 of chamber 10 and is positioned to open toward patient 12.

Figure 2:
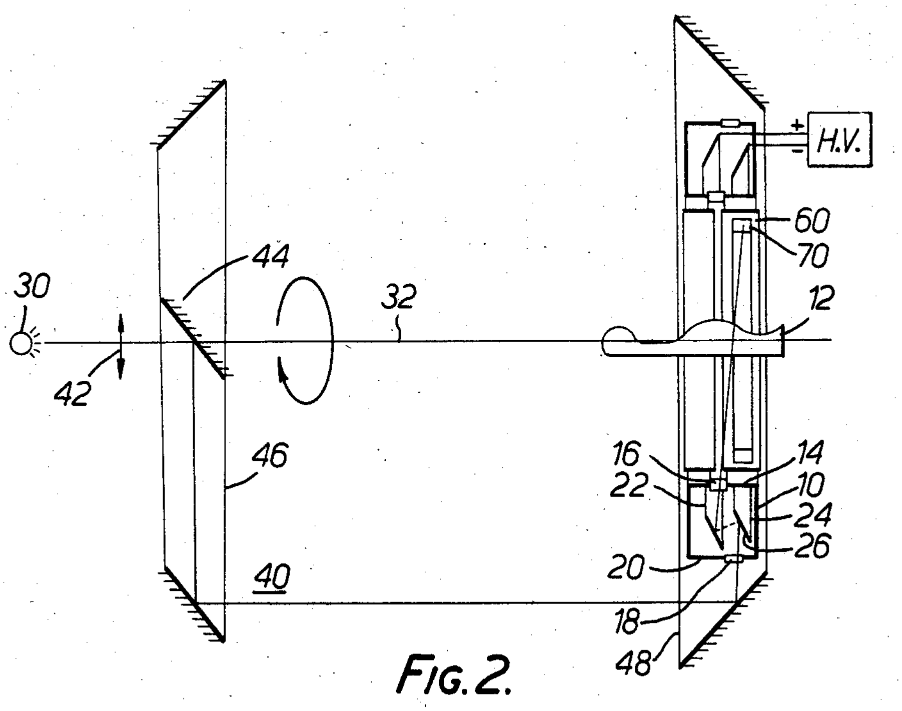
FIG. 2 is a schematic cross-sectional view taken generally along line 2—2 of FIG. 1.

Chamber 10 also is illustrated in FIGS. 1 and 2 as including a light penetrable window 18 opening along a circumferential surface 20 of chamber 10. Light penetrable window 18 should be constructed of materials having suitable transmission and reflective characteristics. In many instances, quartz is a suitable material. Anti-reflective coatings may be employed.

Within chamber 10 there is located a ring-shaped anode 22 which extends annularly around the interior of chamber 10. A ring-shaped cathode 24 is also shown in FIGS. 1 and 2 to extend annularly around the interior of chamber 10 in spaced-apart relation to anode 22. Cathode 24 has one surface 26 which is located with relation to light penetrable window 18 to receive light therethrough.

There is further illustrated in FIG. 2 a light source 30. Light source 30 may comprise a visible light source, an ultraviolet light source, or a laser. Source 30 may be either continuous or pulsating. Source 30 is preferably located along axis 32 of patient 12.

The mechanism utilized for producing elections at cathode 24 can be either photo-electric or thermionic. When light source 30 is a visible light source, cathode surface 26 must be constructed of material capable of emitting electrons in response to receipt of incident light, such as semiconductor or other nonmetallic solids like bialkali or trialkali cathodes. When light source 30 emits ultraviolet light, a metallic or semiconductor cathode surface 26 is required which is photoelectronically sensitive. Light source 30 may be an infrared laser, in which case cathode 24 and surface 26 may comprise suitable metallic elements such as tungsten or tantalum to generate electrons through a thermionic process in response to receipt of incident infrared laser light.

Accordingly, the choice between a photo-electric and thermionic electron emission mechanism will determine the cathode material and the nature of the light source. This choice will also determine the transmission and reflective properties of the optical components through which the light beam will pass, and the structure of the cathode. The cathode must be stable against temperature rise under operation. Photo-emission cathodes may be subjected to several hundred degrees centigrade whereas thermionic emission cathodes may be subject to several thousand degrees centigrade.

Thermionic cathodes may be backed by a high thermal conductivity material such as copper. The copper will emphasize quick heating when a laser beam strikes and quick cooling so that the temperature and, therefore, thermionic emission drops substantially when the laser beam is turned off. The copper, accordingly, permits thermionic cathodes to respond to stimulating light with the least delay.

Photo-electric cathodes must have sufficient quantum efficiency, i.e. the number of electrons generated per incident light quantum. The degree of efficiency must be balanced to the intensity of available incident light.

In accordance with the present invention, there is provided optical means for selectively directing light from a light source through a light penetrable window of an x-ray source chamber onto portions of one surface of an annular cathode located in that chamber.

By way of example and not limitation in FIG. 2, an optical system 40 is shown for selectively directing light from source 30 through light penetrable window 18 onto to selective portions of cathode surface 26. As illustratively shown in FIG. 2, optical system 40 includes a lens system 42, a rotatable mirror 44, a first stationary mirror 46, and a second stationary mirror 48. Mirror 44 is preferably a flat mirror located along axis 32 tangent to a 45° angle cone centered along axis 32. Mirrors 46 and 48 are illustrated in FIG. 2 as being sections of a right angle cone. Mirrors 46 and 48 may, however, have an elliptical or other focusing cross-sectional shape to help concentrate light from source 30 onto a particular location of cathode surface 26.

Mirrors 44, 46, and 48 are oriented such that light from source 30 is reflected by mirror 44 onto a particular location of mirror 46 which is a function of the instantaneous angle of rotation of mirror 44. From mirror 46 this light from source 30 is reflected to a corresponding point on the surface of mirror 48, and then passes from mirror 48 through a corresponding portion of penetrable window 18 onto a corresponding location of cathode surface 26. As mirror 44 rotates, the location of cathode surface 26 struck by light from source 30 is correspondingly rotated along cathode surface 26.

Lens 42 is a illustratively shown in FIG. 2 for the purpose of indicating that various lenses and apertures may be employed along the path of light from source 30 in order to focus a resultant spot of light on a desired section of cathode surface 26.

There is further illustrated in FIG. 2 a high voltage supply 50, a slot collimator 60, and a detector ring 70. High voltage supply 50 is coupled by suitable cables to anode 22 and cathode 24 to provide a high voltage potential between anode 22 and cathode 24, preferably on the order of 100 to 150 kev. With this magnitude potential, electrons emitted from a selected portion cathode surface 26 by incident light from source 30 will be accelerated toward a corresponding selected portion of anode 22 to produce X-rays at that corresponding portion. At least a portion of these X-rays are directed out X-ray penetrable window 16 through the opening of collimator 60 through patient 12 toward detector ring 70. As mirror 44 rotates, the point at which light from source 30 strikes cathode surface 26 varies and causes a corresponding variance in the location along anode 22 at which X-rays are generated.

Figure 3:
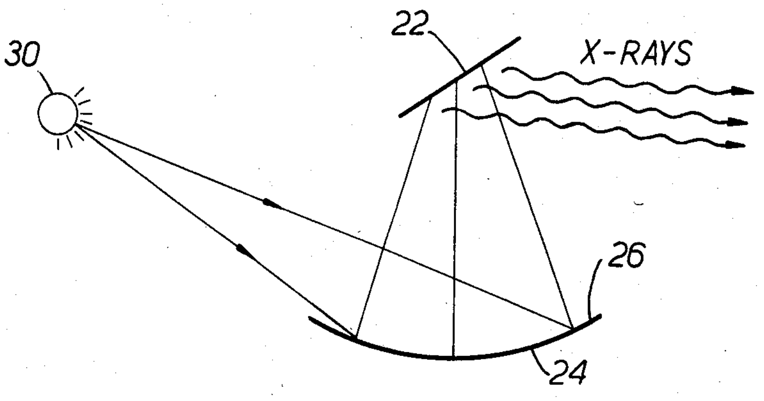
FIG. 3 is a schematic illustration of an anode and cathode arrangement incorporating the teachings of the present invention.

FIG. 3 schematically illustrates the relationship between light source 30, cathode 24, cathode surface 26, anode 22 and the X-rays. As may be seen in FIG. 3, cathode surface 26 need not be a section of a right angle cone, but may rather have an ellipsoidal or other form of focusing shape to help direct electrons to a particular corresponding portion of anode 22.

Figure 4:
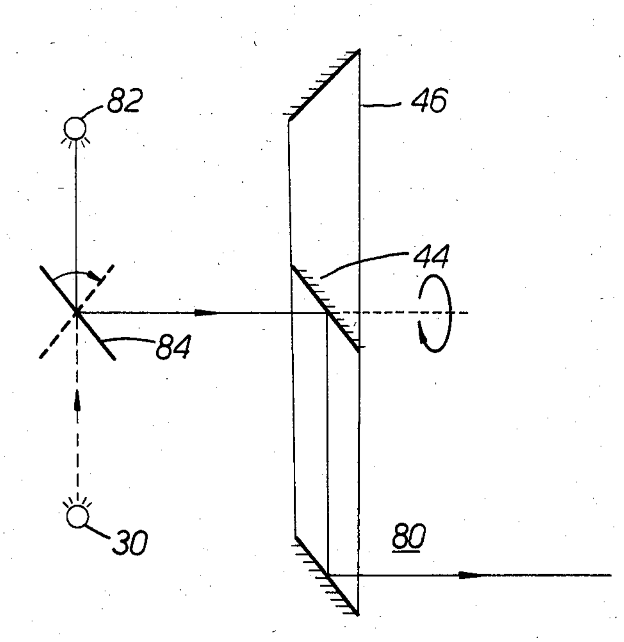
FIG. 4 is a schematic illustration of an embodiment of the present invention employing two light sources.

FIG. 4 schematically illustrates an optical system 80 which employs both a first light source 30 and a second light source 82. To selectively focus light from sources 30 and 82 onto rotating mirror 44, a second rotating mirror 84 is employed.

In summary, either a visible light source, an ultraviolet light source, or an infrared laser is employed to generate light which is focused by an optical system onto a particular section of a ring-shaped cathode. Electrons produced at cathode surface 26 are accelerated and produce X-rays at a corresponding section of ring-shaped anode 22. As mirror 44 rotates, the X-ray source position traces out a circular path on anode 22. The X-rays from anode 22 are restricted by a double ring collimator 70 after passing through X-ray penetrable window 16. After passing through a patient 12 located about axis 32, the X-ray beam strikes a ring of detectors 70. Cathode 24 and anode 22 are basically oriented parallel to each other in order that the X-ray source position or focus spot will have the same size and shape as the optical spot produced on cathode surface 26 by source 30 and optical system 40. A conventional shallow "heel angle" may be used to minimize heat density.

The subject invention, accordingly, provides an apparatus by which focal spot size can be varied easily and continuously. X-ray tube construction is simplified since there are no filament power connections to chamber 10. Feed back control of X-ray intensity is simple to implement by controlling the intensity of source 30. The X-ray tube high-voltage power supply 50 is much simpler than the supply in conventional systems since filament supply and grid supply are eliminated. X-ray tube life can be made longer with utilization of a movable cathode to provide fresh areas for electron emission. Methods for moving the X-ray source or focus spot can be implemented optically and from outside the X-ray tube. X-ray beam intensity profiles can be shaped easily by varying the profile of light source 30. For example, when source 30 is a laser, variations can be made between a flat profile and a double gaussian profile.

The subject invention has potential application in ultrafast CT scanners, fast-scan projection digital radioagraphy systems, fast stereo video-fluoroscope systems, and as a high intensity small focus source for X-ray lithography applications. Accordingly, the use of the term "x-ray scanner" as applied both to the above description and to the preamble of the following claims is intended to have this broad range of potential application.

Fast scans in the order 50 to 200 milliseconds intervals are expected to be easily implemented. Moreover simultaneous multiple X-ray sources can easily be provided. X-ray source positions can be easily and accurately related to the scanning mirror position with the scanning mirror position in turn being computer controlled, thus eliminating the need for a special position sensor. Multiple fast computed tomography slices should be able to be obtained without patient motion through the utilization of multiple anodes. Since no electron optical focusing is required, performance (emission current, focal spot size, etc.) is not restricted by space-charge limited electron-optical requirements. Alignment requirements are simple to meet and can be visually checked with a visible low intensity laser. Morever, "beam parking" facilities of prior art scan electron beam systems are not required in connection with the subject invention.

Additional advantages and modifications will readily occur to those skilled in the art. The invention in its broader aspect is not, therefore, limited to the specific details representative methods and illustrative examples shown and described. Accordingly, departures may be made from such details without departing from the spirit or scope of applicant's general inventive concept.

I claim:

1. An X-ray scanner comprising:

a. a source of X-rays, comprising an annular chamber for at least partially surrounding an object under observation, an X-ray penetrable window in said chamber opening toward said object along a circumferential surface of said chamber, a light penetrable window opening along a circumferential surface of said chamber, an anode extending annularly around the interior of said chamber, a cathode extending annularly around the interior of said chamber in spaced apart relation to said anode and with one surface of said cathode located with relation to said light penetrable window to receive light therethrough;

b. a light source;

c. optical means for selectively directing light from said light source through said light penetrable window onto portions of said one surface of said cathode such that said light scans said cathode to produce electrons therefrom;

d. means for providing a high-voltage potential between said cathode and anode to accelerate said electrons from said portions of said cathode toward corresponding portions of said anode to produce X-rays at said corresponding portions of said anode, at least some of said X-rays being directed through said X-ray penetrable window toward said object.

2. The scanner of claim 1 wherein said optical means includes a rotating mirror.

3. The scanner of claim 2 wherein said light source produces visible light.

4. The scanner of claim 3 wherein said light source is a laser.

5. The scanner of claim 3 wherein said cathode comprises semiconductor material and said electrons are photoelectrically emitted.

6. The scanner of claim 1 wherein said light source produces ultraviolet light and said electrons are photoelectrically emitted.

7. The scanner of claim 6 wherein said cathode comprises semiconductor material.

8. The scanner of claim 6 wherein said cathode is metallic.

9. The scanner of claim 1 wherein said light source is a laser.

10. The scanner of claim 9 wherein said light source is an infrared laser, said cathode comprises a metal, and said electrons are thermionically emitted.

11. The scanner of claim 1 including a second source of light.

* * * * *